(12) United States Patent
Jelaca

(10) Patent No.: US 9,949,324 B2
(45) Date of Patent: Apr. 17, 2018

(54) POWERLESS BLEEDER

(71) Applicant: Dialog Semiconductor GmbH, Kirchheim/Teck-Nabern (DE)

(72) Inventor: Nebojsa Jelaca, Graz (AT)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 38 days.

(21) Appl. No.: 14/706,140

(22) Filed: May 7, 2015

(65) Prior Publication Data

US 2015/0237695 A1     Aug. 20, 2015

Related U.S. Application Data

(63) Continuation of application No. PCT/EP2013/057919, filed on Apr. 16, 2013.

(30) Foreign Application Priority Data

Nov. 7, 2012 (EP) .................................. 12191588

(51) Int. Cl.
H05B 33/08     (2006.01)

(52) U.S. Cl.
CPC ..... *H05B 33/0815* (2013.01); *H05B 33/0845* (2013.01); *H05B 33/0896* (2013.01)

(58) Field of Classification Search
CPC ............ H05B 33/0815; H05B 33/0845; H05B 33/0896; H05B 37/0263; H05B 41/28; H05B 41/3924
See application file for complete search history.

(56) References Cited

U.S. PATENT DOCUMENTS

| | | | |
|---|---|---|---|
| 5,604,411 A | * | 2/1997 | Venkitasubrahmanian ............... H05B 41/28 315/224 |
| 2010/0134038 A1 | | 6/2010 | Shackle et al. |
| 2012/0025729 A1 | | 2/2012 | Melanson et al. |
| 2013/0038236 A1 | * | 2/2013 | Mitarashi .............. H02M 3/156 315/240 |

OTHER PUBLICATIONS

European Search Report 12191588.8-1807, dated May 13, 2014, Dialog Semiconductor GmbH.
EPO Communication, Application No. 12 191 588.8-1927, Applicant: Dialog Semiconductor GmbH, dated Mar. 1, 2017, 4 pgs.

* cited by examiner

*Primary Examiner* — Alexander H Taningco
*Assistant Examiner* — Seokjin Kim
(74) *Attorney, Agent, or Firm* — Saile Ackerman LLC; Stephen B. Ackerman

(57) ABSTRACT

A power efficient method and system for ensuring a reliable operation of dimmers in conjunction with solid state lighting devices such as LED or OLED assemblies is presented. A controller for a driver circuit of a solid state light bulb assembly is described. The solid state light bulb assembly comprises a solid state light source. The driver circuit comprises a switched-mode power converter. The controller is configured to receive an input voltage indicative of a mains electricity supply submitted to a dimmer; to determine that the dimmer is in an off-phase, based on the input voltage; and, if it is determined that the dimmer is in an off-phase, to generate a control signal for the switched-mode power converter to operate the switched-mode power converter in a switched mode for discharging one or more capacitances at an input of the switched-mode power converter.

19 Claims, 9 Drawing Sheets

POWERLESS BLEEDER

TECHNICAL FIELD

The present document relates to illumination systems. In particular, the present document relates to a power efficient method and system for ensuring a reliable operation of dimmers in conjunction with solid state lighting devices such as LED or OLED assemblies.

BACKGROUND

For many decades GLS (General Lighting Service) or incandescent lamps have been the first choice for illumination in residential applications. These light sources could easily be dimmed using so called phase-cut dimmers. This has led to a large installed base of such dimmers. These dimmers are designed to work on relatively high loads with a substantial power consumption.

New types of light sources like CFL (Compact Fluorescent Lamp) or LED lamps offer very small loads (typically a factor of 10 less than the equivalent GLS lamp) in combination with a highly nonlinear behavior and a large capacitive impedance due to the presence of EMI (Electro-Magnetic Interference) filter networks. Due to these aspects, LED based lamps and CFL assemblies cannot be dimmed inherently using existing phase-cut dimmers. With advanced electronics it is possible to emulate dimming functionality. However, due to technical/physical limitations, the dimming range as well as the range of supported dimmers and configurations in terms of the number and mix of parallel lamps operated with a particular dimmer is limited. Furthermore, the additional circuits typically lead to increased costs and, in most cases, to additional power losses in the lamp assemblies.

SUMMARY

The present document addresses the above mentioned problems. In particular, the present document describes a method and system which allow for a reliable and power efficient operation of solid state lighting (SSL) devices in conjunction with conventional dimmers. According to an aspect, a controller for a driver circuit of a solid state light bulb assembly is described. The solid state light bulb assembly comprises a solid state light source, e.g. one or more LEDs or OLEDs. The driver circuit typically comprises a switched-mode power converter, wherein the switched-mode power converter may comprise a switch which is configured to alternate the power converter between a first state and a second state. In the first state, the power converter may draw power (e.g. a current) from an input of the power converter and in the second state, the power converter may transfer the power (e.g. a current) towards an output of the power converter. Examples for switched-mode power converters are a single-ended primary-inductor converter, a buck-converter, a boost converter, a buck-boost converter and/or a flyback converter.

Typically, the controller operates the driver circuit (i.e. the switched-mode power converter and in particular the switch of the switched-mode power converter) in a steady-state mode. In such a steady-state mode, the driver circuit may be operated such that an output voltage of the driver circuit is regulated to a pre-determined voltage level (e.g. to the on-voltage of the light source). In other words, in the steady-state mode (also referred to herein as the regular dimmer-on operation state), the switched-mode power converter may be operated such that the output voltage of the switched-mode power converter is regulated to the pre-determined voltage level. For this purpose, the controller may be configured to receive a signal indicative of the output voltage. Furthermore, the controller may be configured to generate a control signal for the driver circuit (e.g. a gate control voltage for a gate of the switch of the switched-mode power converter) based on the signal indicative of the output voltage. The control signal may be used to adapt a commutation cycle rate and/or a duty cycle (i.e. a ratio of the time interval during which the switch is in on-state and the time interval of a complete commutation cycle), such that the output voltage is regulated to the pre-determined voltage level.

Typically, the switched-mode power converter comprises a DC-to-DC converter which is configured to convert a rectified DC input voltage into the DC output voltage. The driver circuit typically comprises a rectifier (e.g. a full-wave rectifier) in order to convert the AC input voltage into the rectified DC input voltage. Furthermore, the driver circuit typically comprises an input capacitor e.g. to reduce the ripple of the rectified DC input voltage (also referred to herein as the rectified input voltage). In addition, the driver circuit may comprise electromagnetic interference (EMI) circuitry at the input of the driver circuit, in order to shield high frequency distortions caused by the switched-mode power converter from the mains supply.

It is desirable to operate solid state light bulb assemblies in conjunction with dimmers, e.g. phase-cut dimmers. However, due to the low amount of power drawn by such solid state light bulb assemblies, the dimmers may not operate correctly. By way of example, a TRIAC (Triode for Alternating Current) comprised within a dimmer may fire multiple times, due to the fact that the current drawn by the light bulb assembly falls below the holding current of the TRIAC. The controller described in the present document may be configured to control the driver circuit such that the solid state light bulb assembly enables a stable operation of the dimmer to which it is coupled, while at the same time preserving the power efficiency of the solid state light bulb assembly.

For this purpose, the controller may be configured to receive an input voltage (or an input signal) indicative of a mains electricity supply which has been submitted to a dimmer. By way of example, the driver circuit may comprise input voltage sensing means configured to provide an input voltage indicative of a waveform of a voltage provided by the mains electricity supply. The input voltage sensing means may comprise e.g. a voltage divider at an input of the driver circuit (between an electrical connection module adapted for connection to the mains supply and the rectifier of the driver circuit). The input voltage (or the input signal) may be indicative of one or more half cycles of the waveform provided by the mains supply. As the mains supply has been submitted to a dimmer, the waveform typically comprises segments with zero voltage (when the dimmer is in off-phase) and sinusoidal segments (when the dimmer is in on-phase). The input voltage may be indicative of an absolute value of the waveform provided by the mains supply.

Alternatively or in addition, the controller may be configured to receive an indication of a current through the switch of the power converter. For this purpose, the driver circuit may comprise current sensing means configured to provide the indication of the current through the switch of the power converter.

The controller may be configured to determine that the dimmer is in an off-phase, e.g. based on the input voltage or based on the indication of the current through the switch of the power converter. By way of example, the controller may be configured to compare the input voltage to a reference voltage (e.g. 40V to 50V), in order to determine whether the dimmer is in an off-phase or an on-phase. In particular, the controller may determine that the dimmer is in an off-phase if the input voltage is smaller than the reference voltage. Alternatively or in addition, the controller may determine that the dimmer is in an on-phase if the input voltage is equal to or greater than the reference voltage.

Alternatively or in addition, the controller may be configured to determine that the dimmer is in an off-phase, based on a current through the switch of the switched-mode power converter (also referred to as the power converter switch). The current through the switch of the power converter may be determined using current sensing means comprising e.g. a shunt resistor in series with the switch of the power converter. The controller may be configured to determine that the length of an on-period of the switch of the power converter is equal to or greater than a pre-determined on-time interval. In particular, the controller may be configured to determine that the current through the power converter switch does not reach a pre-determined peak current within the pre-determined on-time interval. If this is the case, the controller may conclude that the dimmer is in an off-phase. In other words, the controller may be configured to determine that the dimmer is in an off-phase, based on the sensed current through the power converter switch and based on a pre-determined peak current and a pre-determined on-time interval. The controller may determine that the dimmer is in an off-phase based on the observation that the sensed current through the power converter switch does not reach the pre-determined peak current in the pre-determined on-time interval. This observation may be due to the fact that no more energy is supplied to the light bulb assembly from the mains electricity supply.

Furthermore, the controller may be configured to determine that the dimmer is in an on-phase, based on the sensed current through the power converter switch. If the dimmer has been determined to be in an off-phase, the controller may conclude that the dimmer has entered an on-phase upon observation that the sensed current through the power converter switch has reached the pre-determined peak current. This may be due to the fact that energy is again supplied to the light bulb assembly from the mains electricity supply. Hence, the controller may be configured to determine that the dimmer is in an on-phase, based on the observation that the current through the power converter switch has reached the pre-determined peak current (for a first time after a determined off-phase of the dimmer).

As such, the controller may be configured to receive an indication of the current through the power converter switch (e.g. using current sensing means). Furthermore, the controller may be configured to determine whether the current through the power converter switch reaches the pre-determined peak current within the pre-determined on-time interval, in order to determine whether the dimmer is in an off-phase or an on-phase.

It should be noted that the controller may be configured to determine the on-phase and/or the off-phase of the dimmer based on the input voltage and based on the sensed current through the power converter switch (in combination).

The controller may be configured to generate a control signal for the switched-mode power converter to operate the switched-mode power converter in a switched mode, even if it is determined that the dimmer is in an off-phase. The switched mode that the power converter is operated in while the dimmer is in an off-state may also be referred to as a dimmer-off operation state. The switched mode may e.g. comprise a boundary conduction mode. In other words, the controller may be configured to operate the switched-mode power converter in a switched mode, in order to discharge one or more capacitances at the input of the driver circuit or the input of the power converter (e.g. a capacitance comprised within the dimmer, a capacitance comprised within the EMI circuitry and/or the input capacitor), and in order to transfer the charge from the input of the driver circuit/power converter to the output of the driver circuit/power converter (e.g. to an output capacitor at the output of the driver circuit). By doing this, it is ensured that the energy comprised within the capacitance at the input of the driver circuit is not wasted. Furthermore, it is ensured that the driver circuit is prepared for an upcoming firing of the dimmer, thereby reducing the risk of multi-firing of the dimmer. As a result of the complete discharging of the capacitance at the input of the driver circuit, it can be ensured that the firing of the dimmer leads to a distinct edge within the input voltage, which can be reliably detected, thereby allowing for a reliable control of the power converter. Furthermore, the complete discharging of the capacitance at the input of the driver circuit leads to a defined state of the dimmer in preparation of an upcoming firing of the dimmer. As a result of putting the dimmer into a defined (discharged) state, the risk of uncontrolled oscillations within the dimmer and of an uncontrolled firing of the dimmer can be reduced. In addition, the controlled discharging of the capacitance enables the driver circuit to represent a low impedance to the dimmer upon firing of the dimmer.

The controller may be configured to operate the switched-mode power converter such that a current through a first inductor (at the input) of the power converter does not exceed a pre-determined peak current (e.g. $I_{p1}$). In this context, the controller may be configured to determine whether a current through the switch of the switched-mode power converter is equal to or greater than the pre-determined peak current. For this purpose, the driver circuit may comprise current sensing means (e.g. a shunt resistor at the switch) which are configured to provide a signal indicative of a current through the switch of the switched-mode power converter. Furthermore, the controller may be configured to generate a control signal to put the switch into an off-state, if it is determined that the current through the switch is equal to or greater than the pre-determined peak current. In other words, the controller may be configured to turn off the switch, as soon as the current through the switch reaches the pre-determined peak current. As a result, the first inductor is coupled to the output of the power converter and energy is transferred from the first inductor to the output of the power converter.

The controller may be configured to maintain the switch in an on-state as long as the current through the switch is smaller than the pre-determined peak current. This means that if the current through the switch does not reach the pre-determined peak current (e.g. because the capacitance at the input of the driver circuit has been fully discharged), the switch remains in on-state, thereby providing a low impedance to the dimmer, and thereby ensuring a reliable firing of the dimmer.

The controller may be configured to determine whether a first time interval during which the switch of the switched-mode power converter is in off-state is equal to or greater than a pre-determined first off-time interval. If it is determined that the first time interval is equal to or greater than the pre-determined first off-time interval, the controller may be configured to generate a control signal to put the switch into an on-state. In other words, the controller may be configured to maintain the switch in off-state for a time which is equal to the first off-time interval, subsequent to which the switch is turned on again. By appropriately selecting the first off-time interval, it can be ensured that the current through the first inductor does fall to zero while the switch is in off-state. In particular, the first off-time interval may be selected such that the power converter is operated in a Boundary Conduction Mode or in a Continuous Conduction Mode.

Overall, the controller may be configured to generate a control signal which operates the power converter in a switched mode, even when the dimmer is in an off-phase. However, during the off-phase of the dimmer, the power converter is not operated to regulate the output voltage of the driver circuit, the power converter is rather operated to ensure a controlled discharge of the capacitance at the input of the driver circuit and a controlled transfer of the stored energy to the output of the driver circuit. Furthermore, the power converter is operated to provide a low impedance towards the dimmer, thereby ensuring a reliable firing of the dimmer. In order to ensure the controlled discharge and energy transfer, as well as the low impedance, the power converter may be controlled by determining the switching instants of the switch of the power converter based on a pre-determined peak current (to turn off the switch) and based on a pre-determined first off-time interval (to turn on the switch). In particular, the switch may not be controlled based on the output voltage of the driver circuit (or based on a signal which is indicative thereof).

The controller may be configured to determine that the dimmer is in an on-phase, based on the input voltage (e.g. by determining that the input voltage exceeds the reference voltage). The controller may be configured to generate a control signal for the switched-mode power converter to operate the switched-mode power converter in a current draw mode, i.e. a mode with increased inductor current (also referred to herein as the initial dimmer-on operation state), if it is determined that the dimmer is in an on-phase. In other words, as soon as the controller determines that the dimmer has fired, the controller may start to operate the power converter in accordance to an initial dimmer-on operation state, in order to avoid a multi-firing of the dimmer. As indicated above, the switched-mode power converter typically comprises a first inductor at an input of the switched-mode power converter. The controller may be configured to generate a control signal to operate the switched-mode power converter such that the current through the first inductor exceeds a holding current of the dimmer (i.e. exceeds a pre-determined threshold current, wherein the pre-determined threshold current may be determined based on the holding current of the dimmer, e.g. using a worst-case assumption). By doing this, a multi-firing of the dimmer may be avoided.

The operation of the power converter in a mode with increased inductor current is typically only performed during a limited time interval (referred to herein as the pre-determined initial dimmer-on time interval). Subsequent to the initial dimmer-on time interval, there is typically no more risk for multi-firing. As such, the controller may be configured to determine whether a second time interval during which the switched-mode power converter is operated in a mode with increased inductor current is equal to or greater than the initial dimmer-on time interval. If it is determined that the second time interval is equal to or greater than the pre-determined initial dimmer-on time interval, the controller may be configured to generate a control signal to operate the switched-mode power converter in the steady-state mode (i.e. in the mode where the output voltage of the driver circuit is regulated). In other words, subsequent to the initial dimmer-on time interval, the controller may operate the power converter in the steady-state mode.

As such, directly subsequent to the firing of the dimmer and for a time interval which corresponds to the initial dimmer-on time interval, the controller may be configured to operate the power converter in a mode which ensures that the current drawn by the light bulb assembly does not fall below the holding current of the dimmer, thereby preventing a multi-firing of the dimmer. The controller may determine the switching time instants for controlling the switch of the power converter based on the current through the switch, e.g. based on a pre-determined second peak current $I_{p2}$, (to turn off the switch) and based on a second off-time interval (to turn on the switch). The second off-time interval may be determined based on the inductance of the first inductor, to ensure that the current through the first inductor does not fall below the pre-determined holding current of the dimmer.

As such, during the initial dimmer-on phase (with a duration which corresponds to the initial dimmer-on time interval), the controller may be configured to draw a current which exceeds the current drawn during the subsequent dimmer-on phase. This current offset, i.e. the additional current, should be high enough, in order to shift negative current peak oscillations at the firing of the dimmer and to avoid a switch off of the dimmer. During the initial dimmer-on phase, the power converter may operate in a Continuous Conduction Mode (CCM) or in a Boundary Conduction Mode (BCM) or a Discontinuous Conduction Mode (DCM), e.g. with a relatively high peak current.

Overall, it may be stated that the controller is configured to operate the switch of the switched-mode power converter in a switched mode during an on-phase and an off-phase of the dimmer, thereby ensuring that no energy is wasted (e.g. wasted for providing a bleed current during the off-phase of the dimmer). As indicated above, the control signal typically comprises a gate control voltage to be applied to a gate of the switch of the switched-mode power converter.

According to a further aspect, a driver circuit for a solid state light bulb assembly is described. The driver circuit may comprise a switched-mode power converter operable to output a DC output voltage for a solid state light source in dependence upon a received control signal. Furthermore, the driver circuit may comprise a controller according to any of the aspects described in the present document. The driver circuit may be operable to provide the control signal to the switched-mode power converter.

The driver circuit may further comprise an input capacitor at an input of the switched-mode power converter. The input capacitor may be configured to store an electrical charge during an on-phase of a dimmer. Alternatively or in addition, the input capacitor may be configured to block a high frequency ripple from the switched-mode power converter to the mains supply. In addition, the driver circuit may comprise an output capacitor at an output of the switched-mode power converter. The output capacitor may be configured to store an electrical charge to be provided to the solid state light source. The driver circuit may be configured to transfer some or all of the electrical charge of the input capacitor to the output capacitor during an off-phase of the dimmer. The transfer of energy may be performed in accordance to the dimmer-on operation state described in the present document.

According to a further aspect, a light bulb assembly is described. The light bulb assembly comprises a housing and a solid state light emitting device, located within the housing. Furthermore, the light bulb assembly may comprise an electrical connection module, attached to the housing, and adapted for connection to a mains supply. In addition, the light bulb assembly may comprise a driver circuit according to any of the aspects outlined in the present document, located within the housing, connected to receive an electricity supply signal from the electrical connection module, and operable to supply an output voltage to the light emitting device.

According to another aspect, a method for operating a controller and/or a driver circuit as outlined in the present document is described. The method may comprise steps which correspond to the features of the controller and/or driver circuit described in the present document. In particular, the method may comprise determining that a dimmer of a mains electricity supply of a solid state light bulb assembly is in an off-phase. Furthermore, the method may comprise generating a control signal for a switched-mode power converter of the solid state light bulb assembly to operate the switched-mode power converter in a switched mode for discharging one or more capacitances at an input of the switched-mode power converter, if it is determined that the dimmer is in an off-phase.

According to a further aspect, a software program is described. The software program may be adapted for execution on a processor and for performing the method steps outlined in the present document when carried out on the processor. In particular, the software program may be for execution on the controller described in the present document.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

In the present document, a light bulb "assembly" includes all of the components required to replace a traditional incandescent filament-based light bulb, notably light bulbs for connection to the standard electricity supply. In British English (and in the present document), this electricity supply is referred to as "mains" electricity, whilst in US English, this supply is typically referred to as power line. Other terms include AC power, line power, domestic power and grid power. It is to be understood that these terms are readily interchangeable, and carry the same meaning.

Typically, in Europe electricity is supplied at 230-240 VAC, at 50 Hz (mains frequency) and in North America at 110-120 VAC at 60 Hz (mains frequency). The principles set out in the present document apply to any suitable electricity supply, including the mains/power line mentioned, and a DC power supply, and a rectified AC power supply.

Figure 1:
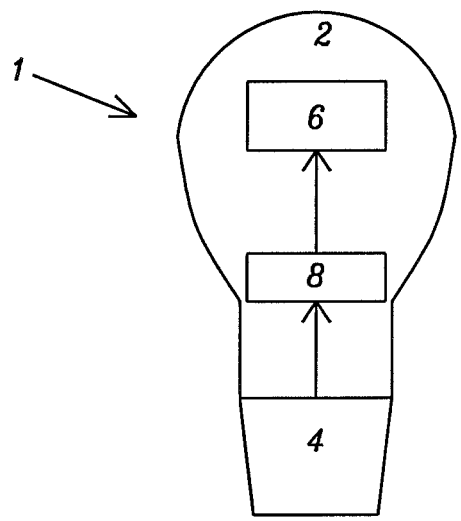
FIG. 1 illustrates a block diagram of an example light bulb assembly.

FIG. 1 is a schematic view of a light bulb assembly. The assembly 1 comprises a bulb housing 2 and an electrical connection module 4. The electrical connection module 4 can be of a screw type or of a bayonet type, or of any other suitable connection to a light bulb socket. Typical examples for an electrical connection module 4 are the E11, E14 and E27 screw types of Europe and the E12, E17 and E26 screw types of North America. Furthermore, a light source 6 (also referred to as an illuminant) is provided within the housing 2. Examples for such light sources 6 are a CFL tube or a solid state light source 6, such as a light emitting diode (LED) or an organic light emitting diode (OLED) (the latter technology is referred to as solid state lighting, SSL). The light source 6 may be provided by a single light emitting device, or by a plurality of LEDs.

Driver circuit 8 (also referred to as power supply arrangement in the present document) is located within the bulb housing 2, and serves to convert supply electricity received through the electrical connection module 4 into a controlled drive current for the light source 6. In the case of a solid state light source 6, the driver circuit 8 is configured to provide a controlled direct drive current to the light source 6.

The housing 2 provides a suitably robust enclosure for the light source and drive components, and includes optical elements that may be required for providing the desired output light from the assembly. The housing 2 may also provide a heat-sink capability, since management of the temperature of the light source may be important in maximising light output and light source life. Accordingly, the housing is typically designed to enable heat generated by the light source to be conducted away from the light source, and out of the assembly as a whole.

In order to make an SSL based lamp compatible with phase-cut dimmers, the power supply arrangement 8 for such an SSL based lamp 1 may provide e.g. the following functions:
 1. Take energy from the mains voltage set by the dimmer.
 2. Filter any voltage fluctuation at the mains supply in order to keep the light output free of flicker.

3. Adjust the SSL lamp current/power (and by consequence the intensity of the emitted light) to the requested dim level.

The present document describes methods and systems which allow for the implementation of one or more of the above mentioned functions. In the following, such methods and systems will be described in the context of LED lamps. It should be noted, however, that the methods and systems described herein are equally applicable to controlling the power provided to other types of illumination technologies such as other types of SSL based lamps (e.g. OLEDs).

Figure 2A:
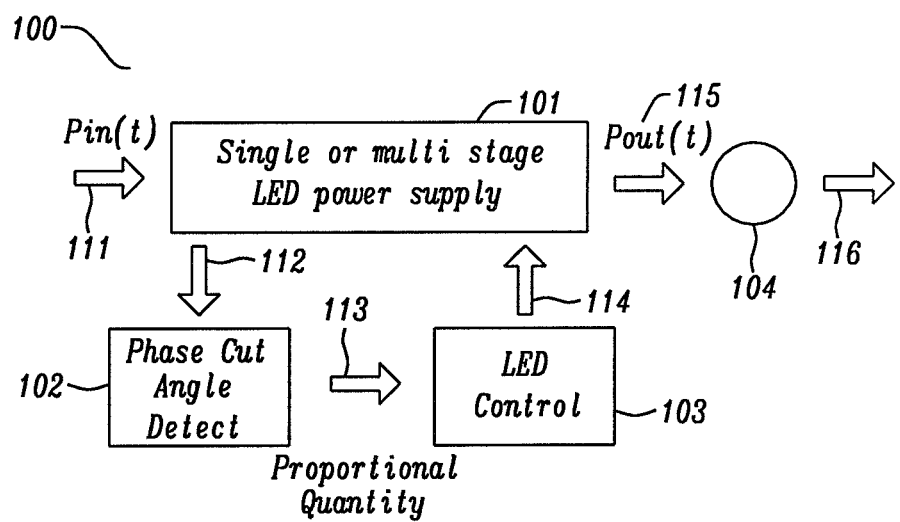
FIG. 2*a* illustrates example power supply arrangements or driver circuits for an LED lamp.

FIG. 2a illustrates a block diagram of a power supply arrangement 100 (or driver circuit) which may be used to control the power for illuminating the LED 104 based on the power provided by the mains power supply. The power supply arrangement 100 receives an input power 111 from the mains supply. The input power 111 may have been adjusted using a dimmer. Various types of dimmers exist, but the most frequently used type of dimmer is a so-called thyristor dimmer or phase-cut dimmer. Thyristor dimmers switch on at an adjustable time (phase angle) after the start of each alternating current half-cycle, thereby altering the voltage waveform applied to lamps and thereby changing its root mean squared (RMS) effective voltage value. Because thyristor dimmers switch part of the voltage supplied (instead of absorbing it), there is very little wasted power at the dimmer. Dimming can be performed almost instantaneous and is easily controlled by remote electronics. Typically, TRIACs (Triode for Alternating Current) are used as thyristors within the dimmers in domestic lightening application. Variants of dimmers are leading edge phase-cut dimmers, tailing edge phase-cut dimmers or intelligent dimmers configured to switch between leading edge and/or tailing edge phase-cut. The methods and systems described herein are applicable to any of the above mentioned variants of dimmers.

As such, phase-cut dimmers are typically configured to remove a particular phase of the sinusoidal mains voltage. This leads to a reduction of the RMS voltage supplied to conventional incandescent lamp, thereby reducing the intensity of the light emitted by the incandescent lamp. On the other hand, energy efficient illumination technologies such as LED or OLED require a pre-determined level of direct current (DC) voltage, such that the modifications to the sinusoidal mains voltage performed by the dimmer cannot be directly used for modifying the intensity of the emitted light. Consequently, power supply arrangements or driver circuits for such energy efficient lamps typically comprise means for converting the phase-cut input voltage into an appropriately reduced power for the illuminant (e.g. the LED or OLED).

Returning now to the example power supply arrangements or driver circuit 100 of FIG. 2a. The example power supply arrangement 100 comprises a phase-cut angle detection unit 102 which senses the input voltage 112 and which estimates the angle at which the original sinusoidal mains voltage has been cut by the dimmer. The estimated angle 113 indicates a desired dim level and is passed to an LED control unit 103 which controls the LED power supply 101 via a control signal 114 to provide an output power 115 to the LED 104 (referred to as light source 6 in FIG. 1) which drives the LED 104 to provide light 116 at the desired dim level.

Figure 2B:
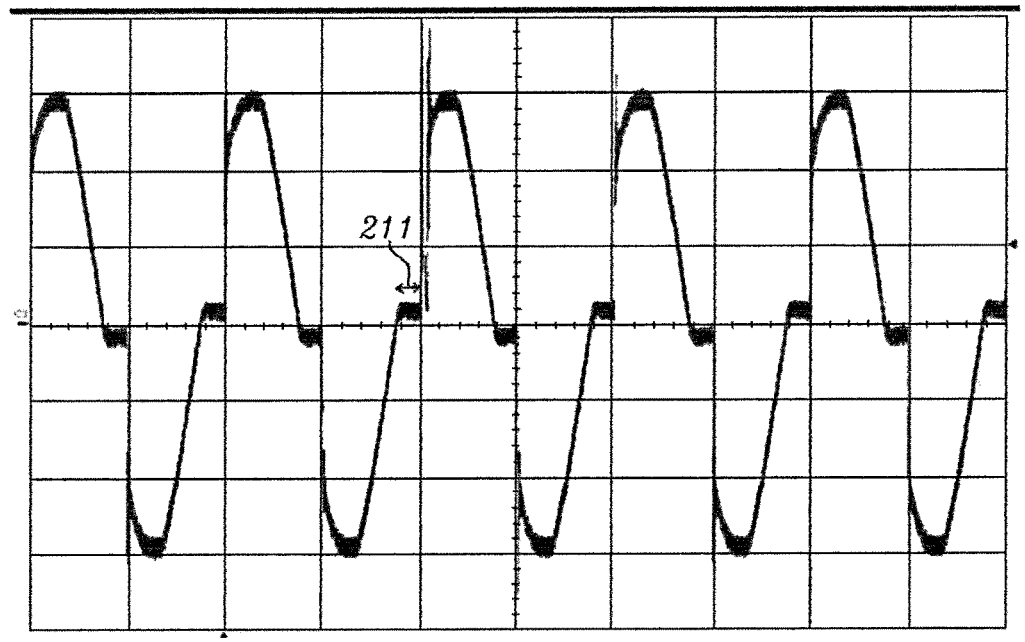
FIGS. 2*b*, 2*c*, 2*d*, 2*e*, 2*f*, and 2*g* illustrate example input voltage waveforms.
Figure 2C:
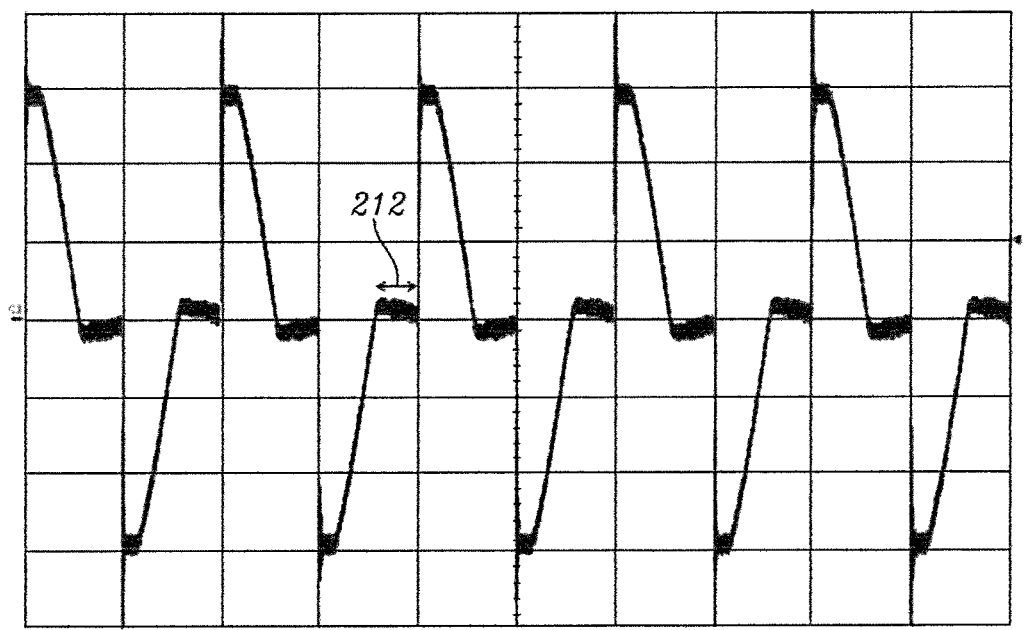
Figure 2D:
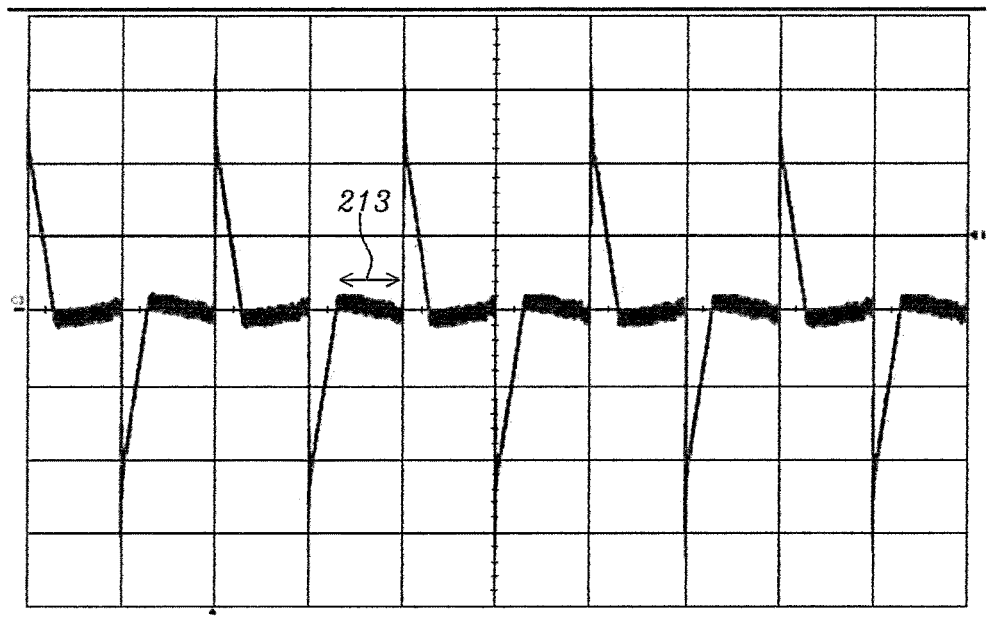

FIGS. 2b, 2c and 2d illustrate example waveforms 201, 202, 203 of input voltage waveforms 112. The illustrated waveforms 201, 202, 203 are typical voltage waveforms for incandescent light bulbs when used with a leading edge phase-cut dimmer. The respective "conduction angles" 211, 212, 213 of the dimmer are a function of the potentiometer turn angle which controls the average power delivered to the incandescent light bulbs. Due to a large power load of typical incandescent light bulbs, the dimmer fires within every mains period. The phase-cut angle 211 (also referred to as the "conduction angle" because it indicates the angle at which the phase-cut dimmer goes to an on-mode, i.e. starts conducting) indicates a 100% angle setting with a maximum amount of power delivered to the light bulb, the phase-cut angle 212 indicates a 50% angle setting with a medium amount of power delivered to the light bulb and the phase-cut angle 213 indicates a 0% angle setting with a minimum amount of power delivered to the light bulb.

Figure 2E:
Figure 2F:
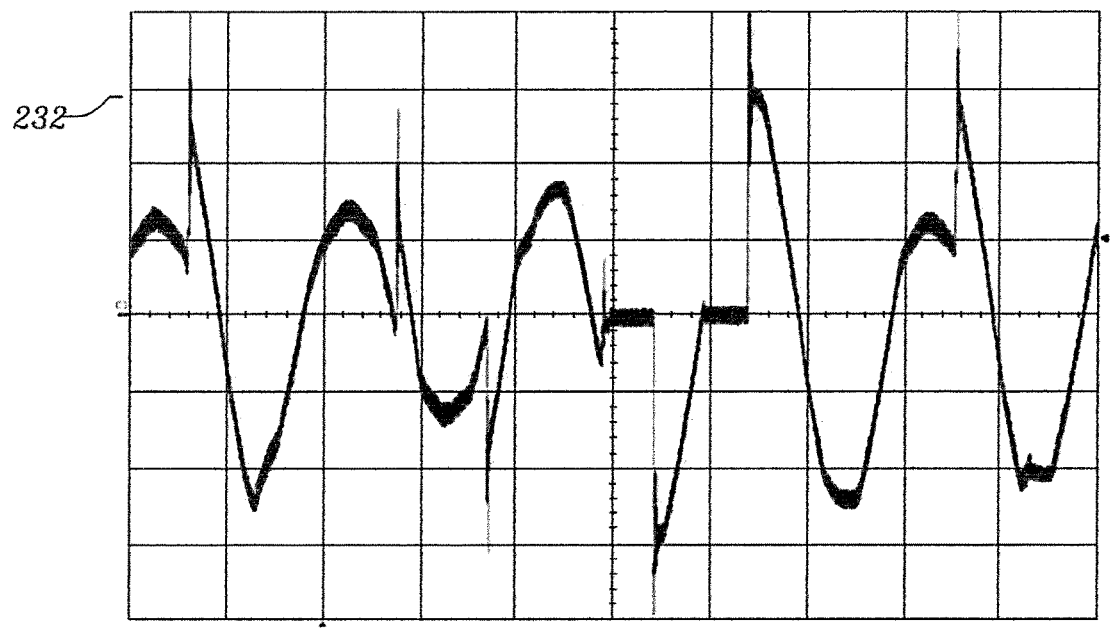
Figure 2G:
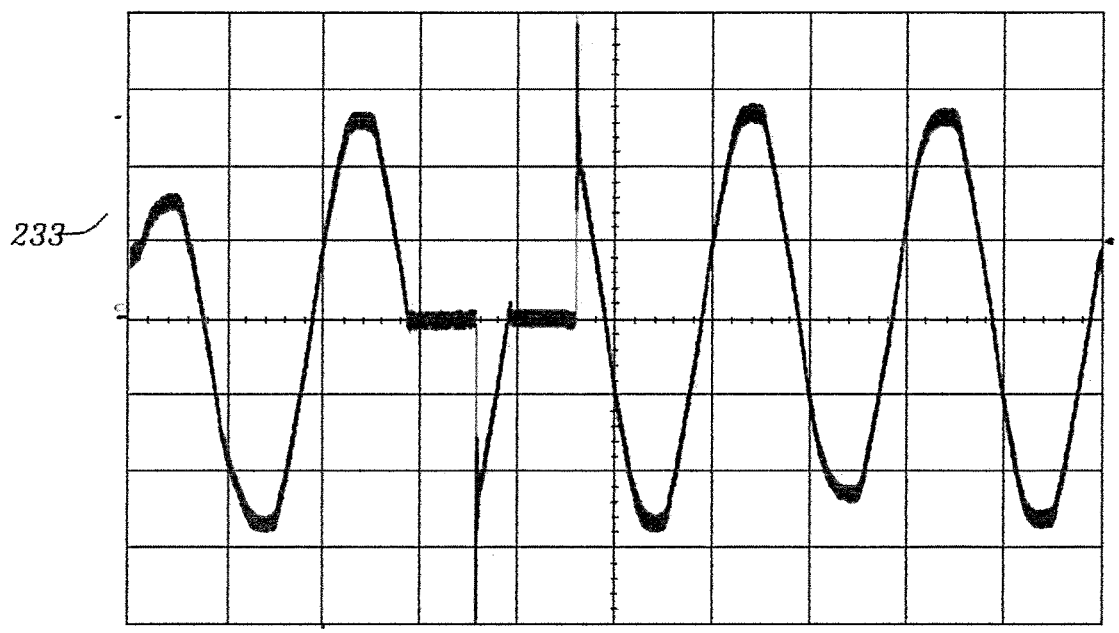

This is different when using low power loads such as SSL light bulb assemblies. Typical phase-cut dimmers only perform correctly when having a resistive load connected to them, which consumes a pre-determined minimum amount of power (as e.g. a conventional incandescent lamp of at least 40 W) and/or which draws a pre-determined minimum amount of current. When being used for dimming energy efficient LED lamps (at power levels in the range of 2 to 10 W), the input voltage waveform 112 generated by typical phase-cut dimmers may be significantly distorted. Distortions to the input voltage waveform may be due to effects such as multi firing, capacitive phase shift, and discontinuous operation of the dimmers. Example waveforms 231, 232, 233 of input voltages to a driver circuit are illustrated in FIGS. 2e, 2f and 2g. The waveform 231 corresponds to a 100% angle setting for which a maximum amount of power is to be delivered to the light source 6, 104, the waveform 232 corresponds to a 50% angle setting for which a medium amount of power is to be delivered to the light source 6, 104 and the waveform 233 corresponds to a 0% angle setting for which a minimum amount of power is to be delivered to the light source 6, 104. It can be seen that at the 100% angle setting, the dimmer performs multi-firing, that at the 50% angle setting, the dimmer is firing randomly and that at the 0% angle setting, the dimmer may not operate at all.

As a consequence, the settings of a phase-cut dimmer (and the corresponding desired illumination level) may not be easily derivable from the waveforms 231, 232, 233 of the input voltage to a drive circuit of a low load SSL device 104. In order to ensure a correct operation of the phase-cut dimmer, light bulb assemblies 1, notably power supply arrangements 100 may make use of a so called bleeder circuit (e.g. a resistor or a current source) which represents a load to the phase-cut dimmer. However, such bleeder circuits lead to additional power losses of the light bulb assembly 1, thereby partially annihilating the benefit of low load SSL devices 104. Furthermore, such bleeder circuits tend to be bulky and expensive, thereby increasing the overall cost of the light bulb assembly. The present document therefore addresses the technical problem of an efficient and reliable bleeder circuit. In particular, the present document describes a method and system which ensures the correct operation of a phase-cut dimmer, in a power efficient manner. The method and system make use of a discharge of capacitive voltage levels at the mains terminal of the light bulb assembly 1, thereby resetting the input voltage in phases where a phase-cut dimmer is in off-mode. The method and system may be configured to determine the phase-cut angle. The determined phase-cut angle may be used to set the degree of illumination of the light source 6, 104.

As outlined above, current control may be implemented within a SSL based light bulb assembly 1, in order to properly operate the light bulb assembly 1 in conjunction with phase-cut dimmers. A disadvantage of this approach is that the bleeder circuits used for such current control produce additional losses leading to a lower system efficiency compared to light bulb assemblies and driver circuits which are designed for (or are used in) fixed operation (i.e. without a dimmer). Furthermore, the required bleeder circuits (e.g. resistors) tend to be bulky and expensive.

The present document describes how to generate a bleed current using switch mode techniques, in order to reduce the power losses introduced by dimming and in order to avoid the use of additional components (for an explicit bleeder circuit).

In order to keep a TRIAC in stable operation, the input current to the power converter 101 of FIG. 2*a* of the light bulb assembly 1 may be increased above a given value during the dimmer off-phase and/or during a pre-determined time interval after the TRIAC fires. During dimmer off-time the converter may be operated in a switching mode like a BCM (Boundary Conduction Mode) with a constant peak current $I_{p1}$ and unlimited driver on-time. Other operation modes are also possible during dimmer-off time (i.e. during the dimmer-off phase). During a pre-determined (relatively short time interval) after the TRIAC fires, the power converter 101 may be operated in a constant continuous conduction mode (CCM) with a constant peak current $I_{p2}$ (which may be equal to $I_{p1}$). Other operation modes are also possible subsequent to the firing of the TRIAC (i.e. during the initial dimmer-on phase). The energy which is consumed by the power converter 101 during this time interval may be transferred into a bulk capacitor 323 of FIG. 3 at the output of the power converter 101 (e.g. at the DC link voltage 333 of FIG. 3). Thereby, the power is not dissipated but transferred into the LED 6 of FIG. 1, 104 of FIG. 2*a*. This reduces the power dissipation caused by the bleed current generation and increases system efficiency.

It should be noted that the parameters of the power converter 101 may be controlled by a digital controller system and the settings (e.g. the peak currents $I_{p1}$ and $I_{p2}$ or a reference voltage 401 (see FIG. 4)) may be adjusted and stored using a storage unit (e.g. a One Time Programmable, OTP, storage device). This allows for a fast and simple optimization of the power supply arrangement 100 (i.e. of the driver circuit).

Figure 3:
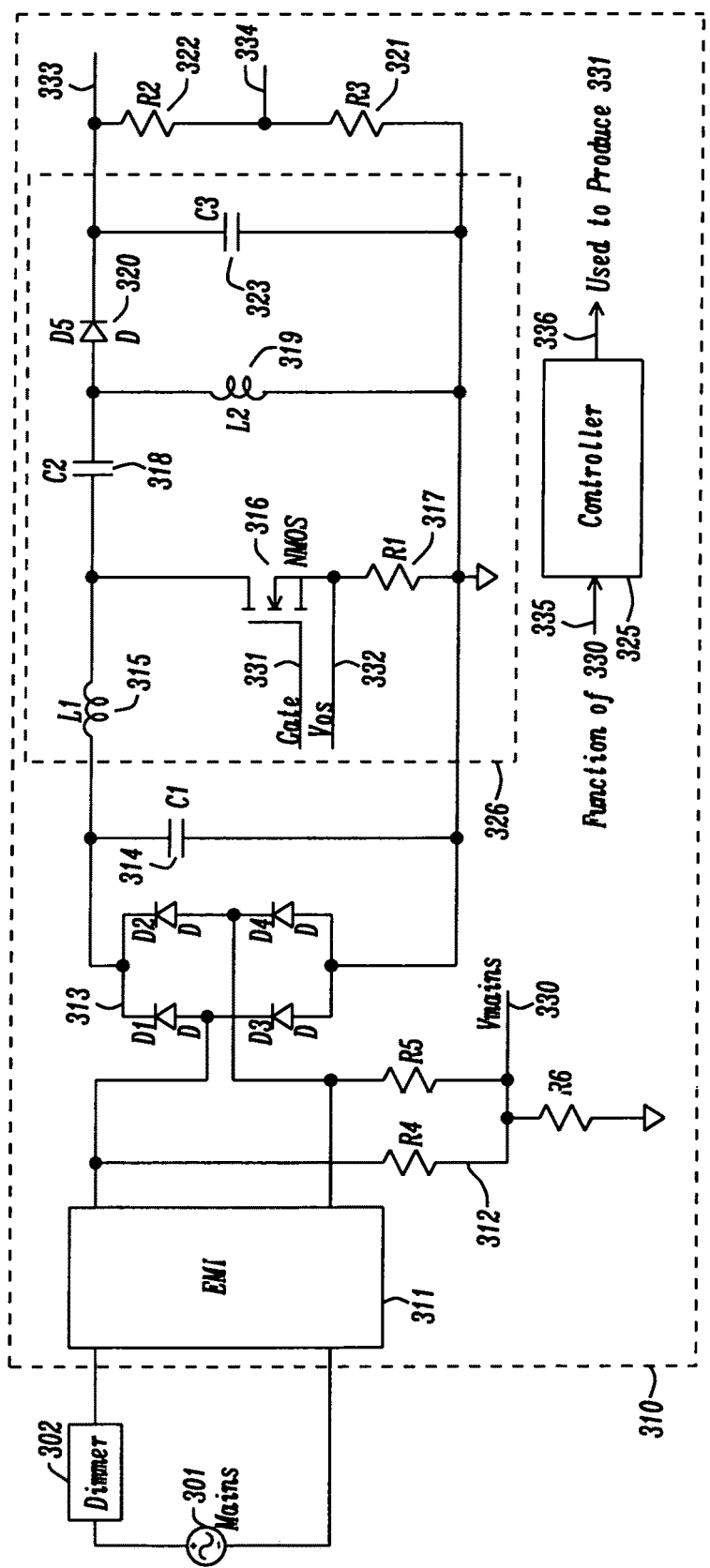
FIG. 3 illustrates an example driver circuit for an SSL device in conjunction with a dimmer.

Reference is now made to FIG. 3 for further details. A possible bleeder concept is to add a resistive load or a current source to a driver circuit 310, wherein the resistive load or current source are configured to draw enough current during the dimmer off-phase and thereby discharge energy stored in the capacitance at the input of the driver circuit 310. The capacitance at the input of the driver circuit 310 may comprise the capacitance of the input capacitor 314, a capacitance comprised within the EMI circuitry 311 and/or a capacitance comprised within the dimmer 302). However, this bleeder concept adds additional power losses in form of heat and additional costs to the light bulb assembly 1. In the present document, a bleeder concept is described, which works in switching mode with an improved efficiency and low power losses.

FIG. 3 shows a block diagram of an example driver circuit 310 (also referred to as power supply arrangement 100) for supplying power to an SSL device 6, 104. The driver circuit 310 receives power from a mains supply 301 via a dimmer 302 (e.g. a phase-cut dimmer). The driver circuit 310 may comprise electromagnetic interference (EMI) circuitry 311 at the interface towards the mains power supply, in order to prevent feedback from the driver circuit 310 towards the mains supply.

Figure 4:
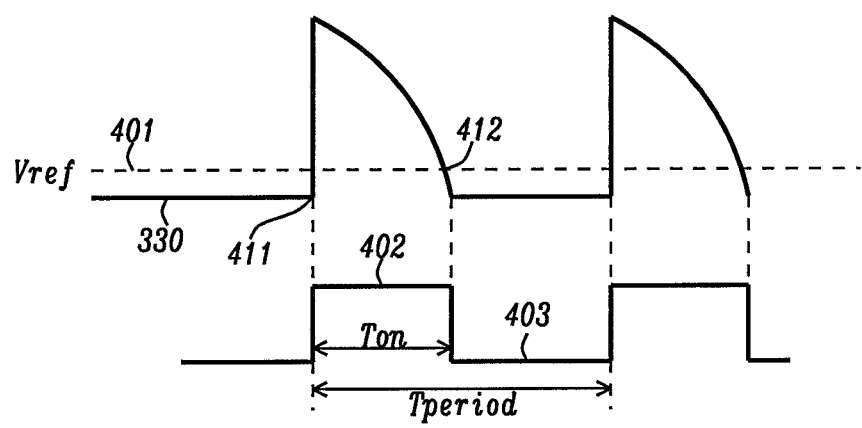
FIG. 4 illustrates an example scheme for detecting a phase-cut angle.

The driver circuit 310 comprises input voltage sensing means 312 which are configured to sense the input voltage Vmains 330 at the input of the driver circuit 310 (prior to rectification). As such, the input voltage 330 is indicative of the waveform of the mains voltage provided by the mains supply 301 and the dimmer 302. In the illustrated example, the input voltage sensing means 312 comprise the resistors R4, R5 and R6 which are arranged such that the input voltage 330 is indicative of the absolute half-cycles of the mains voltage. A typical example of the input voltage 330 is illustrated in FIG. 4. In the example of FIG. 4, the input voltage 330 results from a mains voltage which has been submitted to a leading edge phase-cut dimmer 302.

Furthermore, the driver circuit 310 of FIG. 3 comprises a rectifier 313 (e.g. a full-wave rectifier) and an input capacitor C1 314. The input capacitor 314 may be configured to smoothen the voltage provided by the rectifier 313, thereby reducing the ripple of the voltage provided by the rectifier 313. The voltage across the input capacitor 314 may be referred to as the rectified input voltage. In addition, the driver circuit 310 comprises a power converter 326. In the illustrated example, the power converter 326 is a switched-mode power converter, notably a single-ended primary-inductor converter, i.e. a SEPIC power converter. It should be noted that the bleeder concept described in the present document is applicable to a large variety of switched-mode power converters, notably buck converters, boost converters, buck-boost converters, etc. Furthermore, the bleeder concept is also applicable to multi-stage power converters comprising a plurality of power converter stages.

The SEPIC converter 326 of FIG. 3 comprises a first inductor L1 315, a switch 316 (e.g. a MOSFET, metal oxide semiconductor field effect transistor, such as an N-type MOS), a capacitor C2 318, a second inductor L2 319, and a diode D5 320. The switch 316 is typically operated in a binary on/off switching mode at a pre-determined commutation cycle rate according to a pre-determined duty cycle, thereby transferring power from the mains supply 301 to the output of the driver circuit 310 (i.e. to the light source 6). The switch 316 is typically controlled via a gate control signal 331 (e.g. a gate control voltage) applied to a gate of the switch 316.

The driver circuit 310 further comprises current sensing means 317 (e.g. a shunt resistor R1 317) which are configured to determine a drain-source current through the switch 316. In the illustrated example, the current sensing means 317 comprise the shunt resistor 317, thereby providing a resistor voltage Vos 332 which is proportional to the drain-source current through the switch 316. In other words, the resistor voltage 332 is indicative of the current through the switch 316.

The power converter 326 or the driver circuit 310 may further comprise an output capacitor C3 323 which is typically arranged in parallel to the output of the driver circuit 310 (e.g. in parallel to the light source 6 coupled to the driver circuit 310). The output capacitor 323 may be configured to store energy which is to be provided to the light source 6. The voltage across the output capacitor 323 may be referred to as the output voltage 333 (or the DC link voltage). The illustrated driver circuit 310 makes use of a voltage divider comprising the resistors R2 322 and R3 321, thereby providing a voltage 334 (referred to as Vdc_link) which is indicative (proportional) to the output voltage 333.

The driver circuit 310 may comprise a controller 325 which is configured to control the power converter 326 (in particular the switch 316 of the power converter 326) using a control signal 336. The control signal 336 which is generated by the controller 325 may correspond to (e.g. may be proportional or equal to) the gate control signal 331. The control signal 336 may e.g. be a pulse width modulated (PWD) signal which is applied to the gate of the switch 316 in order to alternate the switch 316 between the on-state and the off-state of the switch 316. The controller may be configured to determine the control signal 336 based on one or more controller input signals 335. The controller input signals 335 may comprise e.g. the input voltage 330, the voltage 332 indicative of the switch current (i.e. the current through the switch 316), and/or the voltage 334 (which is indicative of the output voltage 333).

The controller 325 may be configured to operate the power converter 326 (in particular the switch 316) in accordance to a plurality of different states. The plurality of different states may comprise a fixed state, wherein the fixed state may be used when the driver circuit 310 is directly coupled to the mains supply 301 without the use of a dimmer 302. Alternatively or in addition, the plurality of different states may comprise a dimmer-off operation state, wherein the dimmer-off operation state may be used when the dimmer 302 is in off-mode (i.e. prior to firing of the dimmer 302). Alternatively or in addition, the plurality of different states may comprise an initial dimmer-on operation state, wherein the initial dimmer-on operation state may be used directly subsequent to firing of the dimmer 302. Alternatively or in addition, the plurality of different states may comprise a regular dimmer-on operation state, wherein the regular dimmer-on operation state may be used when the dimmer 302 is in on-mode (i.e. subsequent to firing of the dimmer 302 and possibly subject to further conditions).

The controller 325 may be configured to select one of the plurality of different states for operating the power converter 326, based on the one or more controller input signals 335. In particular, the controller 325 may comprise a state machine comprising the plurality of different states (e.g. the fixed state, the dimmer-off operation state, the initial dimmer-on operation state and/or the regular dimmer-on operation state). Each of the plurality of different states specifies a respective mode of operation of the power converter 326. The state machine may define possible transitions between at least some of the plurality of different states. The transitions may be performed subject to the detection of respective events. An event may be defined based on one or more conditions with respect to the controller input signals 335. By way of example, an event may comprise the condition that the input voltage 330 crosses a pre-determined reference voltage (e.g. the reference voltage Vref 401 of FIG. 4) and/or the condition that the switch current reaches a pre-determined peak current.

As such, the controller 325 may be configured to operate the power converter 326 in accordance to a sequence of states, wherein a target state may be determined from a current state using a state machine. By way of example, the controller 325 may operate the converter 326 in the fixed state, if it is determined that the driver circuit 310 is directly coupled to the mains supply 301 (without a dimmer 302). Alternatively or in addition, the controller may operate the converter 326 in the dimmer-off operation state (upon detection of the event that the input voltage 330 falls below the reference voltage 401). Alternatively or in addition, the controller may operate the converter 326 in the initial dimmer-on operation state (upon detection of the event that the input voltage 330 increases above the reference voltage 401). Alternatively or in addition, the controller may operate the converter 326 in the regular dimmer-on operation state (upon detection of the event that the controller has already been operated in the initial dimmer-on operation state for a pre-determined time interval, of e.g. 100 µs).

The different states may be used to adapt the operation of the driver circuit 310 to the different conditions of the mains supply (no dimmer, dimmer in on-mode (i.e. dimmer has fired), dimmer in off-mode (i.e. dimmer is blocking), thereby enabling a stable and power efficient operation of a light bulb assembly 1 comprising the driver circuit 310 in conjunction with a dimmer 302.

The power converter 326 of the driver circuit 310 is typically used to regulate the output voltage 333 (i.e. the DC link voltage) which is proportional to the voltage 334 (i.e. the Vdc_link). In particular, when the power converter 326 is operated in accordance to the regular dimmer-on state, the power converter 326 may be operated such that the output voltage 333 of the power converter 326 is regulated to a target voltage (e.g. to the on-voltage of the light source 6). Furthermore, the power converter 326 may be used for bleeder operation during the dimmer off-phase (i.e. when the dimmer 302 is in off-mode).

As outlined above, the mains voltage may be measured by the divider combination 312 R4, R5, R6, thereby yielding the input voltage 330 which comprises information regarding the phase (i.e. the conduction angle) and voltage level of the mains voltage. An example input voltage 330 is illustrated in FIG. 4. The input voltage 330 may be compared to a reference voltage 401. The reference voltage may be variable and may be set to ca. 40-50V. The controller 325 may be configured to detect the bleeder-on event 411, when the input voltage 330 starts to exceed the reference voltage 401, and the bleeder-off event 412, when the input voltage 330 drops below the reference voltage 401. The events 411, 412 re-occur at every half-cycle, in accordance to the mains frequency. The events 411, 412 indicate to the controller 325 the beginning of an on-phase 402 and the beginning of an off-phase 403 of the dimmer 302, respectively.

The negative edge of the digital signal of FIG. 4, i.e. the bleeder-off event 412, signals to the controller 325 of FIG. 3 the need for bleeder operation. The control logic (i.e. the controller 325) may be configured to switch from a regulation mode (i.e. from the regular dimmer-on operation state) to a mode with constant inductor peak current (i.e. to the dimmer-off operation state). In other words, the controller 325 may be configured to perform a transition from the regular dimmer-on operation state to the dimmer-off operation state, upon detection of the dimmer-off event 412.

During the dimmer-off operation state, the controller 325 may be configured to control the switch 316 based on the sensed current through the switch 316 (i.e. based on the sensing voltage 332). The switch 316 may be controlled such that the current through the switch 316 does not exceed a pre-determined peak current $I_{p1}$. For this purpose, the switch 316 may be kept in on-state until the voltage 332 (which is indicative of the current through the switch 316) reaches a pre-determined threshold level. As a result, the current through the switch 316 is interrupted as soon as it reaches the peak current $I_{p1}$. Subsequently, the switch 316 may be kept in the off-state e.g. for a pre-determined off-time interval $T_{off}$ and/or until the current through the first inductor 315 drops to zero. Subsequent to the off-time interval $T_{off}$ and/or subsequent to the inductor current dropping to zero, the switch 316 may be put into on-state again, thereby allowing a current flow through the switch 316. As such, the power converter 326 is operated in a Boundary Conduction Mode (BCM). Due to the first inductor 315, the current through the switch 316 ramps up until it reaches the pre-determined peak current $I_{p1}$, upon which the switch 316 is put into off-state. The alternation of on-states and off-states is repeated until the capacitances at the input of the driver circuit 310 (e.g. the capacitance of the first capacitor 314, the EMI circuitry 311 and/or the dimmer 302) are discharged. The maximum gate on-time may be set to an infinite value. This means that if the input capacitance is discharged such that the current through the switch 316 does not reach the pre-determined peak current $I_{p1}$ anymore, the switch 316 is maintained in on-state. As a result, the driver circuit 310 exhibits a low impedance towards the mains supply.

Figure 5A:
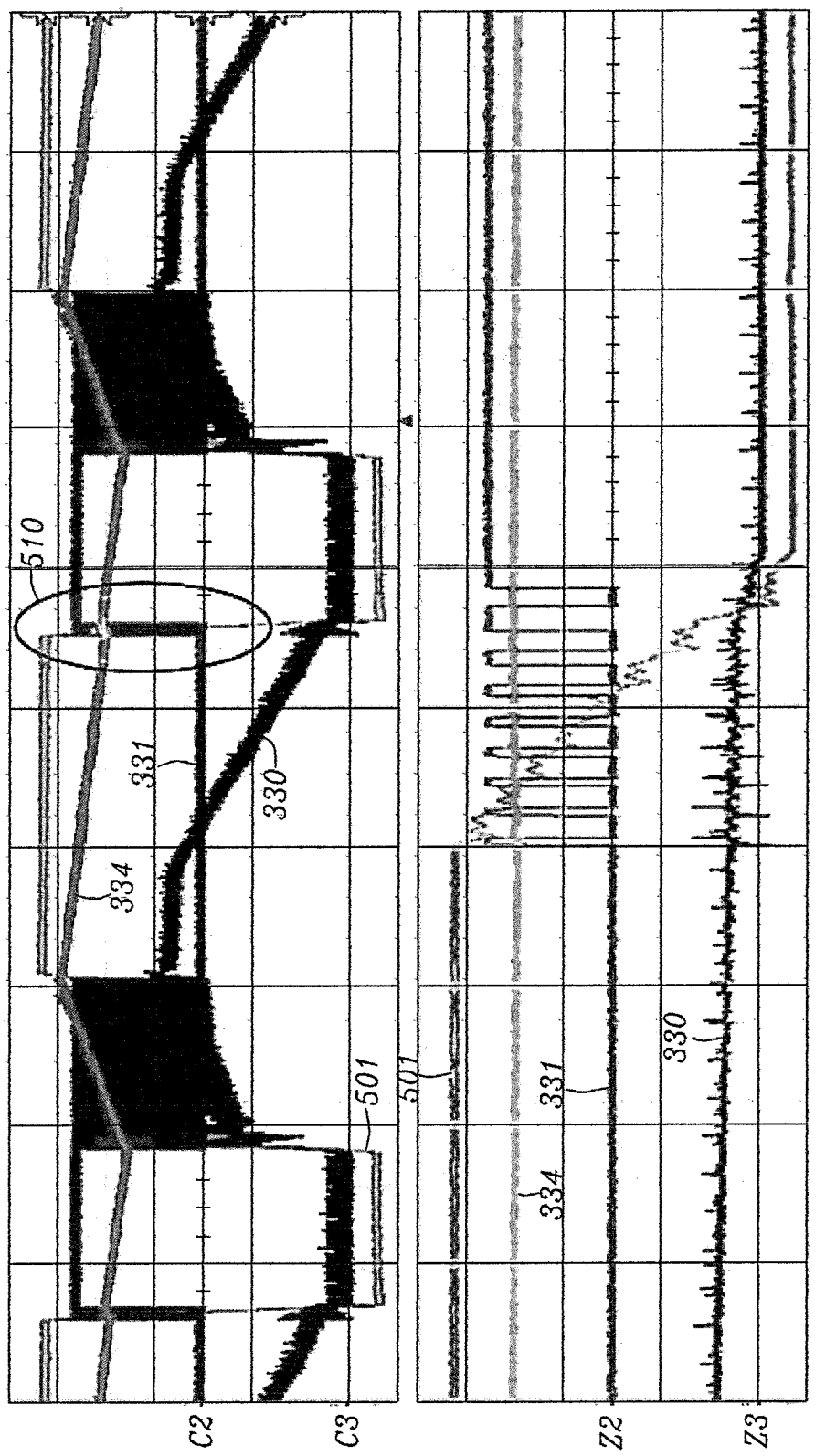
FIGS. 5*a* and 5*b* show example experimental measurements for the driver circuit of FIG. 3.

As a result of the switched operation of the power converter 326 in the dimmer-off operation state, the energy stored in the input capacitor 314 and the EMI filter 311 is transferred to the output capacitor 323. This can be observed in FIG. 5a, where the operation of the power converter 326 in the dimmer-off operation state is illustrated. The upper part of FIG. 5a illustrates the operation of the power converter 326 across a plurality of half-cycles. In particular, FIG. 5a illustrates the input voltage 330, the gate control voltage 331, the voltage 334 (which is indicative of the output voltage 333) and the rectified input voltage 501 (i.e. the voltage across the input capacitor 314). The lower part of FIG. 5a illustrates a zoomed excerpt 510 of the upper part of FIG. 5a. This excerpt 510 corresponds to the beginning of the off-phase 403 of the dimmer 302, i.e. to a time interval subsequent to the dimmer-off event 412.

As outlined above, upon detection of the dimmer-off event 412, the controller 325 operates the power converter 326 in accordance to the dimmer-off operation state. It can be seen from the lower part of FIG. 5a that the gate control voltage 331 oscillates between high and low, wherein the length of the high phases increases. This is due to the fact that at the same time, the rectified input voltage 501 decreases, as the energy stored in the input capacitor 314 decreases. Furthermore, it can be seen that the gate control voltage 331 remains high, once the input capacitor 314 is completely discharged. At the same time, the voltage 334 (which is indicative of the energy stored in the output capacitor 323) increases, thereby illustrating the fact that the energy stored in the input capacitor 314 is transferred to the output capacitor 323. As a result, the input voltage 330 falls to zero.

The above mentioned dimmer-off operation state is different compared to other bleeder concepts which use a resistive load or current source for discharging and thereby lose the energy stored in the input capacitor 314 in form of heat. Due to the fact that during the time period, when the power converter 326 is operated in accordance to the dimmer-off operation state, the dimmer is switched off, there is no additional energy coming from the input to maintain the process of energy transfer and the bleeder system cannot reach the peak current. This leads to an infinite on-time of the switch 316 (which remains constantly switched on) and to a low load impedance for the dimmer 302. By doing this a stable operation of the dimmer 302 during the off-phase of the dimmer 302 can be ensured.

The situation remains unchanged until the dimmer 302 fires again, i.e. until the detection of a dimmer-on event 411 of FIG. 4. As soon as the dimmer 302 is in its on-phase 402, additional energy is delivered and the inductor current increases. When the inductor current reaches a peak threshold $I_{p1}$, the switch 316 may be put into off-state. The detection of the dimmer-on event 411 (e.g. in combination with the detection of the event that the current through the switch 316 reaches the pre-determined peak current $I_{p1}$) may be taken by the controller 325 as a trigger to change the operation state of the controller to the initial dimmer-on operation state.

The initial dimmer-on operation state may comprise the operation of the power converter 326 in accordance to a CCM (Continuous Conduction Mode). Other operation modes are also possible during the initial dimmer-on phase. During the CCM, the power converter 326 is controlled such that the driver circuit 310 draws a so called bleeder current to avoid the TRIAC misfiring and at same time to transfer the energy to the output. In particular, the CCM may be such that the inductor current through the first inductor 315 does not fall below a minimum current threshold, wherein the minimum current threshold ensures that the dimmer 302 does not misfire. By way of example, the minimum current threshold may be determined based on the holding current of the dimmer 302. The initial dimmer-on operation state may be relatively short. During the initial dimmer-on state the current drawn by the power converter should be sufficiently high to ensure that the current through the dimmer remains above the holding current of the dimmer. The voltage at the input capacitor 314 typically remains nearly constant during the initial dimmer-on phase. The voltage at the input capacitor 314 should be higher than the mains voltage in order to avoid drawing current from the dimmer which might be lower than the holding current of the dimmer. The time of CCM operation may be in the range of several 100 µs. Typically, the dimmer 302 comprises various parasitic inductances, resistances and/or capacitances. These components may lead to oscillations upon firing of the dimmer 302. The length of the time interval of the initial dimmer-on state may be determined based on the inductances, resistances and/or capacitances comprised within the dimmer 302, e.g. based on the time constants defined by the inductances, resistances and/or capacitances comprised within the dimmer 302.

In view of the fact, that during the initial dimmer-on operation state, the energy is transferred from the input to the output of the driver circuit 310, the efficiency of the driver circuit 310 is improved compared to driver circuits which make use of resistive or current source bleeders. Subsequent to the initial dimmer-on operation state (which is also referred to as the bleeder operation), the power converter 326 may be operated in accordance to the regular dimmer-on operation state (which may also be referred to as the normal regulation mode or the steady-state mode).

Figure 5B:
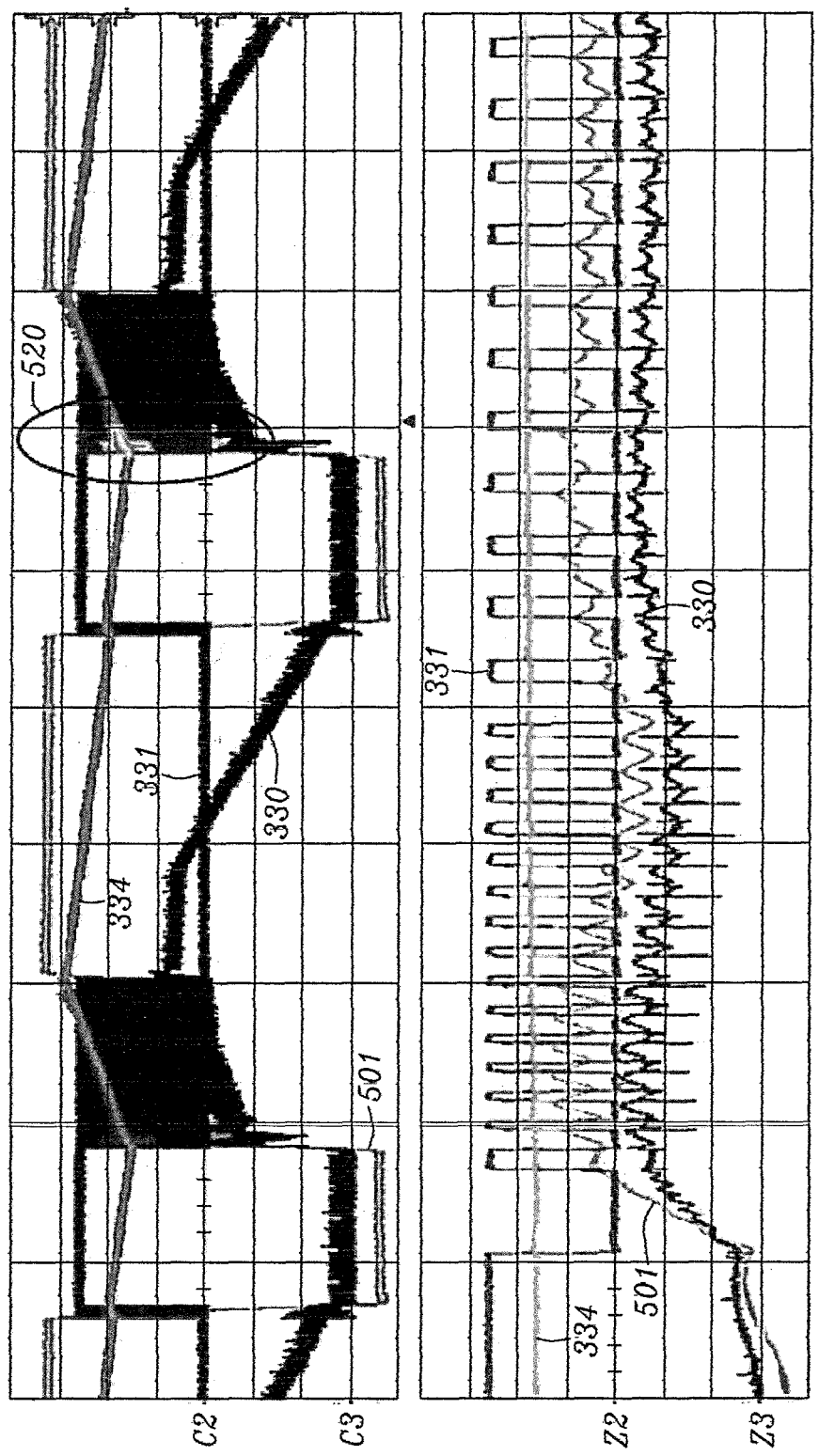

The initial dimmer-on operation state is illustrated in FIG. 5b. The upper part of FIG. 5b corresponds to the upper part of FIG. 5a. The lower part of FIG. 5b shows the zoomed excerpt 520 which corresponds to the beginning of the dimmer-on phase 402. It can be seen that at the beginning of the on-phase 402 of the dimmer 302, the rectified input voltage 501 slowly increases, due to the power supplied by the mains supply 301. The gate control voltage 331 is put to low, as soon as the current through the switch 316 reaches the pre-determined peak current $I_{p1}$. As a consequence of this, the controller 325 enters the initial dimmer-on operation state during which the power converter 326 is operated in a continuous conduction mode which ensures that the current through the inductor 315 (i.e. the current drawn by the driver circuit 310) does not fall below a minimum current which avoids a misfiring of the dimmer 302. This can be ensured by setting a relatively short off-time interval $T_{off}$ for the switch 316 (which is shorter than the off-time interval $T_{off}$ during the boundary conduction mode used in the dimmer-off operation state). Alternatively or in addition, the pre-determined peak current $I_{p1}$ can be selected such that the current through the inductor 315 (i.e. the current drawn by the driver circuit 310) does not fall below a minimum current which avoids a misfiring of the dimmer 302.

It can be seen in FIG. 5b that when operating in CCM, the gate control voltage 331 alternates rapidly between high and low. Furthermore, it can be seen that subsequent to a time interval (and/or subsequent the rectified input voltage 501) reaching a pre-determined minimum level, the power converter 326 enters the normal regulation mode (which, in the illustrated example, has a reduced commutation cycle rate).

It should be noted that the controller 325 may also be configured to determine the conduction angle set by the dimmer 302 based on the one or more controller input signals 335. This is illustrated in FIG. 4. The controller 325 may be configured to compare the input voltage 330 with a reference voltage 401, thereby determining the length Ton of the on-phase 402 compared to the length Tperiod of the half-cycle. The length Ton and Tperiod is indicative of the conduction angle. The controller 325 may be configured to set a drive current to the light source 6 based on the determined length Ton and Tperiod.

Figure 6:
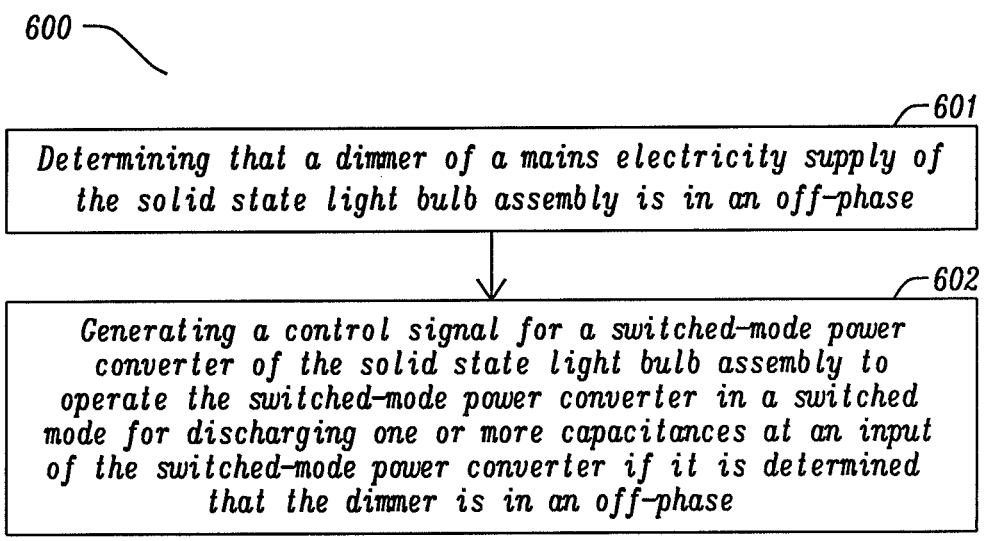
FIG. 6 shows a flow diagram of an example method for operating a light bulb assembly.

FIG. 6 shows an example method 600 for operating a solid state light bulb assembly. The method 600 comprises determining 601 that a dimmer 302 of a mains electricity supply 301 of the solid state light bulb assembly 1 is in an off-phase. If it is determined that the dimmer 302 is in an off-phase, the method 600 proceeds in generating 602 a control signal 336 for a switched-mode power converter 326 of the solid state light bulb assembly 1 to operate the switched-mode power converter 326 in a switched mode for discharging one or more capacitances at an input of the switched-mode power converter 326.

In the present document, a controller for a driver circuit and a driver circuit and a method for controlling a driver circuit have been described. The controller/driver circuit enable SSL based light bulb assemblies to be operated in conjunction with dimmers in a power efficient and stable manner.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A controller for a driver circuit of a solid state light bulb assembly; wherein the solid state light bulb assembly comprises a solid state light source; wherein the driver circuit comprises a switched-mode power converter; wherein the controller is configured to
   determine that a dimmer of a mains electricity supply of the solid state light bulb assembly is in an off-phase;
   when it is determined that the dimmer is in an off-phase, generate a control signal for the switched-mode power converter to operate the switched-mode power converter in a switched mode for discharging one or more capacitances at an input of the switched-mode power converter;
   determine that the dimmer is in a bleeder on-phase based on a non-zero reference voltage;
   when it is determined that the dimmer is in the bleeder on-phase, generate a control signal for the switched-mode power converter to operate the switched-mode power converter in a current draw mode, such that a current drawn by the switched-mode power converter exceeds a holding current of the dimmer;
   determine whether a second time interval during which the switched-mode power converter is operated in the current draw mode is equal to or greater than a pre-determined initial dimmer-on time interval; and
   when the second time interval is equal to or greater than the pre-determined initial dimmer-on time interval, generate a control signal to operate the switched-mode power converter in a steady-state mode; wherein in the steady-state mode, the switched-mode power converter is operated such that an output voltage of the switched-mode power converter is regulated.

2. The controller of claim 1, wherein the controller is further configured to
   determine whether a current through a switch of the switched-mode power converter is equal to or greater than a pre-determined peak current; and
   when the current through the switch is equal to or greater than the pre-determined peak current, generate a control signal to put the switch into an off-state.

3. The controller of claim 2, wherein the controller is configured to maintain the switch in an on-state as long as the current through the switch is smaller than the pre-determined peak current.

4. The controller of claim 1, wherein
   the switched-mode power converter comprises a first inductor at the input of the switched-mode power converter;
   the controller is configured to generate a control signal to operate the switched-mode power converter in the current draw mode such that a current through the first inductor exceeds the holding current of the dimmer.

5. The controller of claim 1, wherein the switched-mode power converter comprises one or more of: a single-ended primary-inductor converter; a buck-converter; a boost converter; a buck-boost converter; a flyback converter.

6. The controller of claim 1, wherein the controller is configured to operate a switch of the switched-mode power converter in a switched mode during an on-phase and an off-phase of the dimmer.

7. The controller of claim 1, wherein the controller is configured to
   receive an input voltage indicative of the mains electricity supply submitted to the dimmer; and
   compare the input voltage to a reference voltage, in order to determine whether the dimmer is in an off-phase or an on-phase; and/or
   receive an indication of a current through a switch of the switched-mode power converter; and
   determine whether the current through the switch of the switched-mode power converter reaches a pre-determined peak current within a pre-determined on-time interval, in order to determine whether the dimmer is in an off-phase or an on-phase.

8. A method for operating a solid state light bulb assembly; the method comprising the steps of:

determining that a dimmer of a mains electricity supply of the solid state light bulb assembly is in an off-phase; and when it is determined that the dimmer is in an off-phase, generating a control signal for a switched-mode power converter of the solid state light bulb assembly to operate the switched-mode power converter in a switched mode for discharging one or more capacitances at an input of the switched-mode power converter;

determining that the dimmer is in a bleeder on-phase based on a non-zero reference voltage;

when it is determined that the dimmer is in the bleeder on-phase, generating a control signal for the switched-mode power converter to operate the switched-mode power converter in a current draw mode, such that a current drawn by the switched-mode power converter exceeds a holding current of the dimmer;

determining whether a second time interval during which the switched-mode power converter is operated in the current draw mode is equal to or greater than a pre-determined initial dimmer-on time interval; and when the second time interval is equal to or greater than the pre-determined initial dimmer-on time interval, generating a control signal to operate the switched-mode power converter in a steady-state mode; wherein in the steady-state mode, the switched-mode power converter is operated such that an output voltage of the switched-mode power converter is regulated.

9. The method for operating a solid state light bulb assembly of claim 8, further comprising the steps of:
determining whether a current through a switch of the switched-mode power converter is equal to or greater than a pre-determined peak current; and
generating a control signal to put the switch into an off-state, when the current through the switch is equal to or greater than the pre-determined peak current.

10. The method for operating a solid state light bulb assembly of claim 9, further comprising the step of:
maintaining the switch in an on-state as long as the current through the switch is smaller than the pre-determined peak current.

11. The method for operating a solid state light bulb assembly of claim 8, wherein
the switched-mode power converter comprises a first inductor at the input of the switched-mode power converter;
the controller generates a control signal to operate the switched-mode power converter in the current draw mode such that a current through the first inductor exceeds the holding current of the dimmer.

12. The method for operating a solid state light bulb assembly of claim 8, wherein the switched-mode power converter comprises one or more of: a single-ended primary-inductor converter; a buck-converter; a boost converter; a buck-boost converter; a flyback converter.

13. The method for operating a solid state light bulb assembly of claim 8, wherein the controller operates a switch of the switched-mode power converter in a switched mode during an on-phase and an off-phase of the dimmer.

14. The method for operating a solid state light bulb assembly of claim 8, further comprising the steps of:
receiving an input voltage indicative of the mains electricity supply submitted to the dimmer; and
comparing the input voltage to a reference voltage, in order to determine whether the dimmer is in an off-phase or an on-phase; and/or
receiving an indication of a current through a switch of the switched-mode power converter; and
determining whether the current through the switch of the switched-mode power converter reaches a pre-determined peak current within a pre-determined on-time interval, in order to determine whether the dimmer is in an off-phase or an on-phase.

15. A driver circuit for a solid state light bulb assembly, the driver circuit comprising:
a switched-mode power converter operable to output a DC output voltage for a solid state light source in dependence upon a received control signal; and
a controller for a driver circuit of a solid state light bulb assembly; wherein the solid state light bulb assembly comprises a solid state light source; wherein the driver circuit comprises a switched-mode power converter; wherein the controller is configured to
determine that a dimmer of a mains electricity supply of the solid state light bulb assembly is in an off-phase;
when it is determined that the dimmer is in an off-phase, generate a control signal for the switched-mode power converter to operate the switched-mode power converter in a switched mode for discharging one or more capacitances at an input of the switched-mode power converter, operable to provide the control signal to the switched-mode power converter;
determine that the dimmer is in a bleeder on-phase based on a non-zero reference voltage;
when it is determined that the dimmer is in the on-phase, generate a control signal for the switched-mode power converter to operate the switched-mode power converter in a current draw mode, such that a current drawn by the switched-mode power converter exceeds a holding current of the dimmer;
determine whether that a current drawn by the switched-mode power converter is operated in the current draw mode is equal to or greater than a pre-determined initial dimmer-on time interval; and
when the second time interval is equal to or greater than the pre-determined initial dimmer-on time interval, generate a control signal to operate the switched-mode power converter in a steady-state mode; wherein in the steady-state mode, the switched-mode power converter is operated such that an output voltage of the switched-mode power converter is regulated.

16. The driver circuit of claim 15, further comprising
an input voltage sensing circuit to provide an input voltage indicative of a waveform of a voltage provided by a mains electricity supply; and/or
a current sensing circuit to provide a signal indicative of a current through a switch of the switched-mode power converter.

17. The driver circuit of claim 15, further comprising
an input capacitor at an input of the switched-mode power converter, configured to store an electrical charge during an on-phase of a dimmer;
an output capacitor at an output of the switched-mode power converter, configured to store an electrical charge to be provided to the solid state light source; wherein the driver circuit is configured to transfer electrical charge of the input capacitor to the output capacitor during an off-phase of the dimmer.

18. A light bulb assembly comprising:
a housing;
a solid state light emitting device, located within the housing;

an electrical connection module, attached to the housing, and adapted for connection to a mains supply; and a driver circuit for a solid state light bulb assembly, the driver circuit comprising:

a switched-mode power converter operable to output a DC output voltage for a solid state light source in dependence upon a received control signal; and a controller for a driver circuit of a solid state light bulb assembly; wherein the solid state light bulb assembly comprises a solid state light source; wherein the driver circuit comprises a switched-mode power converter; wherein the controller is configured to determine that a dimmer of a mains electricity supply of the solid state light bulb assembly is in an off-phase;

when it is determined that the dimmer is in an off-phase, generate a control signal for the switched-mode power converter to operate the switched-mode power converter in a switched mode for discharging one or more capacitances at an input of the switched-mode power converter, operable to provide the control signal to the switched-mode power converter, located within the housing, connected to receive an electricity supply signal from the electrical connection module, and operable to supply an output voltage to the light emitting device;

determine that the dimmer is in a bleeder on-phase based on a non-zero reference voltage;

when it is determined that the dimmer is in the on-phase, generate a control signal for the switched-mode power converter to operate the switched-mode power converter in a current draw mode, such that a current drawn by the switched-mode power converter exceeds a holding current of the dimmer;

determine whether that a current drawn by the switched-mode power converter is operated in the current draw mode is equal to or greater than a pre-determined initial dimmer-on time interval; and when the second time interval is equal to or greater than the pre-determined initial dimmer-on time interval, generate a control signal to operate the switched-mode converter in a steady-state mode: wherein in the steady-state mode, the switched-mode power converter is operated such that an output voltage of the switched-mode power converter is regulated.

19. The controller of claim 1, wherein the controller is further configured to determine whether a first time interval during which a switch of the switched-mode power converter is in off-state is equal to or greater than a pre-determined first off-time interval; and when the first time interval is equal to or greater than the pre-determined first off-time interval, generate a control signal to put the switch into an on-state.

\* \* \* \* \*